United States Patent
Näslund et al.

(10) Patent No.: US 10,469,247 B2
(45) Date of Patent: Nov. 5, 2019

(54) STREAM CIPHERING TECHNIQUE

(71) Applicant: TELEFONAKTIEBOLAGET LM ERICSSON (PUBL), Stockholm (SE)

(72) Inventors: Mats Näslund, Bromma (SE); Elena Dubrova, Sollentuna (SE); Martin Hell, Malmö (SE); Bernard Smeets, Dalby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 316 days.

(21) Appl. No.: 15/535,994

(22) PCT Filed: Dec. 17, 2014

(86) PCT No.: PCT/EP2014/078312
§ 371 (c)(1),
(2) Date: Jun. 14, 2017

(87) PCT Pub. No.: WO2016/096000
PCT Pub. Date: Jun. 23, 2016

(65) Prior Publication Data
US 2017/0338946 A1  Nov. 23, 2017

(51) Int. Cl.
*H04L 9/06* (2006.01)
*H04L 9/08* (2006.01)

(52) U.S. Cl.
CPC .......... *H04L 9/0631* (2013.01); *H04L 9/0668* (2013.01); *H04L 9/0861* (2013.01);
(Continued)

(58) Field of Classification Search
None
See application file for complete search history.

(56) References Cited

U.S. PATENT DOCUMENTS 5,054,067 A * 10/1991 Moroney .............. H04L 9/0668
380/259
5,703,952 A * 12/1997 Taylor .................. H04L 9/0668
380/44
(Continued)

OTHER PUBLICATIONS

Sadkhan et al, "Investigation of the Best Structure for the Nonlinear Combining Function", Mar. 2017, Annual Conference on New Trends in Information & Communications Technology Applications—(NTICT'2017), p. 180-185.*
(Continued)

*Primary Examiner* — Christopher A Revak
(74) *Attorney, Agent, or Firm* — Rothwell, Figg, Ernst & Manbeck, P.C.

(57) ABSTRACT

A technique for generating a keystream (128) for ciphering or deciphering a data stream (122) is provided. As to a method aspect of the technique, a nonlinear feedback shift register, NLFSR (112), including n register stages implemented in a Galois configuration is operated. At least one register stage of the implemented n register stages is representable by at least one register stage of a linear feedback shift register, LFSR. A first subset of the implemented n register stages is representable by a second subset of a second NLFSR. A number of register stages receiving a nonlinear feedback in the second NLFSR is greater than one and less than a number of register stages receiving a nonlinear feedback in the implemented NLFSR. The keystream (128) is outputted from a nonlinear output function (118). An input of the nonlinear output function (118) is coupled to at least two of the implemented n register stages of the NLFSR (112).

62 Claims, 10 Drawing Sheets

(52) U.S. Cl.
CPC .... *H04L 2209/12* (2013.01); *H04L 2209/122* (2013.01); *H04L 2209/125* (2013.01)

(56) References Cited

U.S. PATENT DOCUMENTS

| | | | | |
|---|---|---|---|---|
| 6,278,780 | B1* | 8/2001 | Shimada | H04L 9/0668 380/223 |
| 6,560,338 | B1* | 5/2003 | Rose | H04L 9/0668 380/247 |
| 6,804,354 | B1* | 10/2004 | Driscoll | H04L 9/0668 380/28 |
| 6,961,427 | B1* | 11/2005 | Qiu | H04L 9/0668 380/262 |
| 8,829,984 | B2* | 9/2014 | Batruni | H04K 1/00 327/552 |
| 2001/0021253 | A1* | 9/2001 | Furuya | H04L 9/0625 380/259 |
| 2012/0002803 | A1* | 1/2012 | Adi | H04L 9/0866 380/28 |
| 2014/0016778 | A1* | 1/2014 | Goettfert | H04L 9/0869 380/255 |

OTHER PUBLICATIONS

Fustet-Sabater et al, "Global linear complexity analysis of filter keysteram generators", Jan. 1997, IEEE Proc.-Comp. Digit. Tech., vol. 144, p. 33-38.*
International Search Report and Written Opinion issued in Application No. PCT-EP2014/078312 dated Oct. 9, 2015, 8 pages.
Dubrova, E.: "A Scalable Method for Constructing Galois NLFSRs With Period 2n-1 Using Cross-Join Pairs", IEEE Transactions on Information Theory, vol. 59, No. 1, Jan. 2013, 8 pages.
Mansouri et al.: "An Improved Hardware Implementation of the Grain Stream Cipher", 13th Euromicro Conference on Digital System Design: Architectures, Methods and Tools, Sep. 1, 2010, pp. 433-440.
Dubrova, E.: "A Transformation From the Fibonacci to the Galois NLFSRs", IEEE Transactions on Information Theory, vol. 55, No. 11, Nov. 2009, 9 pages.
Dubrova, E.: "An Equivalence-Preserving Transformation of Shift Registers", International Conference on Sequences and Their Applications, Nov. 18, 2014, pp. 187-199.

* cited by examiner

200

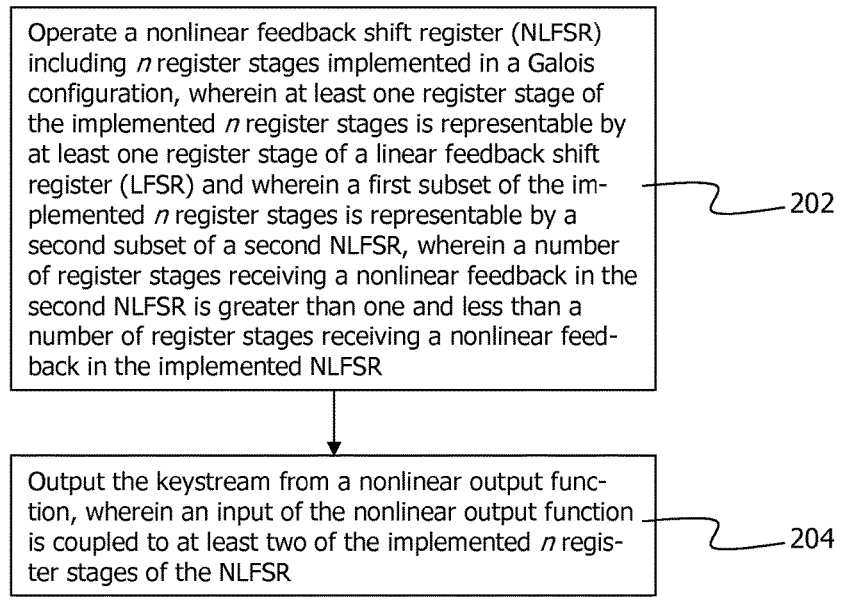

Operate a nonlinear feedback shift register (NLFSR) including $n$ register stages implemented in a Galois configuration, wherein at least one register stage of the implemented $n$ register stages is representable by at least one register stage of a linear feedback shift register (LFSR) and wherein a first subset of the implemented $n$ register stages is representable by a second subset of a second NLFSR, wherein a number of register stages receiving a nonlinear feedback in the second NLFSR is greater than one and less than a number of register stages receiving a nonlinear feedback in the implemented NLFSR — 202

Output the keystream from a nonlinear output function, wherein an input of the nonlinear output function is coupled to at least two of the implemented $n$ register stages of the NLFSR — 204

Fig. 2

STREAM CIPHERING TECHNIQUE

CROSS REFERENCE TO RELATED APPLICATION(S)

This application is a 35 U.S.C. § 371 National Stage of International Patent Application No. PCT/EP2014/078312, filed Dec. 17, 2014, designating the United States, the disclosure of which is incorporated by reference.

TECHNICAL FIELD

The present disclosure generally relates to ciphering and/or deciphering. More specifically, and without limitation, a method and a device for generating a keystream for ciphering or deciphering a data stream are provided. Furthermore, a system for ciphering or deciphering a data stream is provided.

BACKGROUND

Wireless communication requires efficient and secure encryption, which is also known as ciphering. The demand for more efficient ciphering techniques (also known as ciphers) is expected to increase with new generations of wireless communication, e.g., in a 5G system, as the required data rates are expected to significantly increase.

In addition, services vital for society such as transport, e-health, smart-city management and environmental monitoring require security mechanisms providing high levels of assurance.

For encryption purposes, there are two types of ciphers, namely block ciphers and stream ciphers. Block ciphers have been studied for over 50 years. Collected knowledge about their functional definition and cryptanalysis led to an Advanced Encryption Standard (AES), which is widely accepted for strong resistance against various kinds of attacks. Block ciphers can be used in special modes that let them operate as stream ciphers, wherein the data rate of the block cipher is an upper bound to the data rate achievable by the stream cipher. 3G and 4G wireless communication systems use the dedicated stream cipher SNOW3G or stream ciphers based on block ciphers. However, with ciphering data rates below 1 Gbps, existing ciphers would pose a bottleneck in the most demanding LTE-Advanced and 5G applications targeting such data rates.

Though military applications have relied on stream ciphers for a long time, active public investigation of stream ciphers began only about 30 years ago, wherein the security of legacy stream ciphers has been queried. For example, the popular stream ciphers A5/1 and A5/2 used in the Global System for Mobile communications (GSM) standard and the stream cipher EO used in Bluetooth have been found susceptible to a number of attacks described by E. Biham and O. Dunkelman in "Cryptanalysis of the A5/1 GSM stream cipher", Progress in Cryptology, INDOCRYPT 2000, pp. 43-51, Springer, 2000. As a result, the stream cipher A5/1 was replaced by a stream cipher A5/3 that is based on a block cipher, and use of the stream cipher A5/2 was subsequently prohibited.

A further widespread stream cipher, RC4, used to secure wireless networks according to the original IEEE 802.11 standard was shown to be vulnerable, if the beginning of the output keystream is not discarded, if non-random or related keys are used, or if a single keystream is used twice, by E. Tews, R.-P. Weinmann and A. Pychkine in "Breaking 104-bit WEP in under a minute", Cryptology ePrint Archive: Report 2007/120, 2007 (http://eprint.iacr.org/2007/120). As a consequence, the AES replaced the stream cipher RC4 in the IEEE 802.11i standard.

Despite past security problems mentioned above, the need for secure and efficient stream ciphers is expected to increase in future generations of wireless communication, since 5G wireless communication is envisioned to provide on the order of 1000 times higher traffic volume compared to current LTE deployments while improving Quality of Service (M. Olsson et al., 5GrEEn: "Towards green 5G mobile networks", WiMob, pp. 212-216, 2013). Consumer data rates of hundreds of Mbps are expected to be available in general scenarios and multi-Gbps in specific scenarios. In addition, low latency of a few milliseconds or below needs to be supported in use cases for safety or control mechanisms in processing industry, for electrical-distribution grids or for traffic (Ericsson White Paper "5G radio access", June 2013). It is likely that due to their efficiency, dedicated stream ciphers may play an important role in this development, if the necessary security requirements can be met.

SUMMARY

Accordingly, there is a need for an efficient stream ciphering technique providing high level of assurance.

As to one aspect, a method of generating a keystream for ciphering or deciphering a data stream is provided. The method comprises a step of operating a nonlinear feedback shift register (NLFSR) including n register stages implemented in a Galois configuration, wherein at least one register stage of the implemented n register stages is representable by at least one register stage of a linear feedback shift register (LFSR) and wherein a first subset of the implemented n register stages is representable by a second subset of a second NLFSR, wherein a number of register stages receiving a nonlinear feedback in the second NLFSR is greater than one and less than a number of register stages receiving a nonlinear feedback in the implemented NLFSR; and a step of outputting the keystream from a nonlinear output function, wherein an input of the nonlinear output function is coupled to at least two of the implemented n register stages of the NLFSR.

The implementation in the Galois configuration can contribute to the efficiency, e.g., in terms of reducing a propagation delay and/or latency. Notwithstanding an interlinked structure of the Galois configuration, a high level of assurance can be achieved in at least some embodiments of the technique by virtue of the representability. For example, the NLFSR-representation and the LFSR-representation can establish the high level of assurance, e.g. by proving resistance against certain classes of attacks. A register stage or a subset of register stages of one Feedback Shift Register (FSR) may be representable by another FSR, if a register stage or a subset of register stages of the other FSR yields the same sequence, e.g., under the same initialization or under an equivalent initialization for the one FSR and the other FSR.

The Galois configuration may encompass any FSR having more than one register stage receiving a feedback. The feedback may include any update function that is nontrivial. The term "nontrivial" may relate to any update function that is other than (e.g., more than) a mere shift function. Terms of the update function other than the shift function may be referred to as a feedback function. The feedback function may be any function of one or more register stages located in shift direction downstream of the register stage receiving the feedback. A Fibonacci configuration may include any FSR having no more than one register stage receiving a feedback.

Some or all functions, e.g., the linear and nonlinear feedback functions and/or the nonlinear output function may be Boolean functions (i.e., provide Boolean values). Each register stage may represent a Boolean value. The functions may include one or more terms. A term that depends on only one register stage may also be referred to as a linear term. Constant and linear terms of a function may be referred to as linear part of the function. A function including only constant and linear terms may also be referred to as a linear function. A term that depends on more than one register stage may be referred to as a nonlinear term. A function including at least one nonlinear term may be referred to as a nonlinear function. Terms may be connected by an exclusive-OR operation within a function. Boolean values of more than one register stage may be connected by an AND operation within a nonlinear term.

The nonlinear output function may include linear terms. The linear terms of the nonlinear output function (i.e., the linear part of the nonlinear output function) may depend only on the first subset of the implemented n register stages of the NLFSR.

Alternatively or in addition, the nonlinear output function and the implemented NLFSR may be selected so that all most-biased linear approximations of the nonlinear output function depend only on the first subset of the implemented n register stages of the NLFSR. For a given Boolean function, $Z(x_1, \ldots, x_n)$, of a variables and a linear function, $A(x_1, \ldots, x_n)$, of the same variables, the bias e of the approximation A for Z may be computed according to $$Pr[Z(x_1, \ldots, x_n) = A(x_1, \ldots, x_n)] = (1+e)/2,$$

wherein Pr["condition"] is the probability for fulfillment of the "condition" assuming a uniform distribution of the variables $(x_1, \ldots, x_n)$.

For n Boolean variables $(x_1, \ldots, x_n)$, there may be a finite set of linear functions $A(x_1, \ldots, x_n)$. By comparing the truth table of the nonlinear output function Z with the truth tables of each linear function A in the set, the one or more most-biased linear approximations may be determined, e.g. as the one or more linear functions A that equal Z in most cases (or differ in most cases since considering the complement of A gives the same information). Alternatively, more efficient algorithms than comparing all truth tables may be used.

The one or more most-biased linear approximations may be used as a tool in determining whether the keystream is susceptible for attacks. Since the approximations take input from register stages representable by a corresponding register stage in the second NLFSR, the security of a cipher using the keystream may be determined.

The number of register stages receiving a nonlinear feedback in the implemented NLFSR and/or the second NLFSR may be even. The at least one register stage representable by the LFSR may be arranged in shift direction downstream of all nonlinear feedbacks in the implemented NLFSR.

The at least one register stage may include a last stage in shift direction, e.g., an output of the shift register. Alternatively or in addition, the at least one register stage may be a subset of the first subset, e.g., a portion of the first subset including the last register stage receiving a nonlinear feedback and optionally one or more stages further downstream in shift direction. The at least one register stage of the implemented n register stages may further be representable by at least one register stage of the second NLFSR.

Each of the register stages receiving the nonlinear feedback in the second NLFSR may represent a register stage in the implemented NLFSR. The nonlinear feedbacks in the second NLFSR may be computed for each of the register stages receiving the nonlinear feedback according to a common feedback function that is shifted corresponding to the respective register stage.

A nonlinearity of the common feedback function may be greater than 500·n. A resiliency of the common feedback function may be equal to or greater than 5. An algebraic degree of the common feedback function may be equal to or greater than 4. The common feedback function may include less than 0.15·n binary Boolean operations. A period of the implemented NLFSR may be $2^n-1$.

Each of the second NLFSR and the LFSR may include n register stages. The second NLFSR may be in a Galois configuration. The LFSR may be in a Fibonacci configuration.

The first subset may be a proper subset of the implemented n register stages. The first subset may include more than two consecutive register stages of the implemented NLFSR.

Each of the implemented n register stages may represent one bit. Each of the nonlinear feedbacks in the implemented NLFSR may provide a Boolean value that is received by the corresponding register stage according to an exclusive-OR (or exclusive disjunction), e.g., with a result of the shift.

The nonlinear output function may provide a Boolean value for each cycle of the implemented NLFSR. The keystream may be a bit stream. The nonlinear output function may be a balanced Boolean function. A nonlinearity of the nonlinear output function may be greater than 2000·n. A resiliency of the nonlinear output function may be equal to or greater than 5. An algebraic degree of the nonlinear output function may be equal to or greater than 6. An implementation of the nonlinear output function may include less than 0.1·n binary Boolean operations. E.g., the nonlinear output function may be computed using less than 0.1·n binary Boolean operations.

More than half of the register stages, on which the nonlinear output function depends, may be selected from a full positive difference set of the implemented n register stages of the NLFSR. A set may be called a full positive difference set, if all positive pairwise differences between its elements are distinct. Further properties of the full positive difference set may be found in "On the security of nonlinear filter generators", J. Dj. Golic, in "Fast Software Encryption", Lecture Notes in Computer Science, Vol. 1039, pp. 173-188, Cambridge, 1996. Alternatively or in addition, all register stages, on which the nonlinear output function depends, may be non-consecutive in the implemented NLFSR.

The nonlinear output function may be pipelined in a binary tree configuration. A combinatorial circuit depth of the binary tree configuration may be at most 2.

The implemented n registers of the NLFSR may be initialized. The first subset of the implemented n register stages may be at least partially initialized by a key. The initialization may further include clocking the implemented NLFSR for n cycles. The nonlinear output function may be fed back to the implemented NLFSR during the initializing n cycles. After the initialization, the data stream and the keystream outputted from the nonlinear output function may be added for ciphering or deciphering the data stream.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., a wireless communications network providing the data stream and/or the Internet.

As to a hardware aspect, a device for generating a keystream for ciphering or deciphering a data stream is provided. The device comprises a nonlinear feedback shift register (NLFSR) including n register stages implemented in a Galois configuration. At least one register stage of the implemented n register stages is representable by at least one register stage of a linear feedback shift register (LFSR), and a first subset of the implemented n register stages is representable by a second subset of a second NLFSR, wherein a number of register stages receiving a nonlinear feedback in the second NLFSR is greater than one and less than a number of register stages receiving a nonlinear feedback in the implemented NLFSR. The device further comprises a nonlinear output function for outputting the keystream, wherein an input of the nonlinear output function is coupled to at least two of the implemented n register stages of the NLFSR.

As to a further hardware aspect, a system for ciphering or deciphering a data stream is provided. The system comprises a generating device adapted to generate a keystream according to above hardware aspect; an initializing device adapted to initialize the generating device; and an adding device adapted to add the data stream and the keystream generated by the generating device for ciphering or deciphering the data stream.

The device and/or the system may further be adapted to perform any one of the steps of the method aspect. The device and/or the system may further comprise any feature disclosed in the context of the method aspect.

Any one of above aspects may be implemented in an access point (e.g., a radio base station) and/or a user equipment of a wireless communication system.

BRIEF DESCRIPTION OF THE DRAWINGS

In the following, the present disclosure is described in more detail with reference to exemplary embodiments illustrated in the drawings, wherein:

FIG. 2 shows a flowchart for a method of generating a keystream for ciphering or deciphering a data stream, which is implementable in the device of FIG. 1, FIG. 3 schematically illustrates a block diagram of an exemplary nonlinear feedback shift register (NLFSR) in a Galois configuration, which is implementable in the device of FIG. 1;

DETAILED DESCRIPTION

In the following description, for purposes of explanation and not limitation, specific details are set forth, such as specific device environments in order to provide a thorough understanding of the technique disclosed herein. It will be apparent to one skilled in the art that the technique may be practiced in other embodiments that depart from these specific details. Moreover, while the following embodiments are primarily described for a wireless communications network such as a successor of Long Term Evolution (LTE), it will be readily apparent that the technique described herein may also be implemented in other mobile and stationary communications networks, wireless or wired, including 3rd Generation Partnership Project (3GPP) networks, non-3GPP networks (e.g., according to IEEE 802.3 or IEEE 802.11 standard series) and combinations thereof. Moreover, the techniques described may be implemented at one or more layers of a protocol stack, e.g., including a Medium Access Control (MAC) layer, a Packet Data Convergence (PDCP) layer, a network layer (e.g. according to the Internet Protocol or IP), a transport layer (e.g. according to the Transmission Control Protocol or TCP) and/or an application layer.

While the technique is described in the context of ciphering a stream of data, the technique is not limited to processing data streams, particularly not limited to the processing an unbounded data stream. The technique is applicable to a single data item (e.g., a message), which can be viewed as a stream of fixed length, or a sequence of messages (e.g., data packets). Furthermore, the technique is particularly applicable to any communication system susceptible to eavesdropping, including wireless, wired and fiber-optic communication.

Moreover, those skilled in the art will appreciate that the services, functions and steps explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a localized or distributed system comprising at least one computer processor and memory coupled to the processor, wherein the memory is encoded with one or more programs that may perform the services, functions and steps disclosed herein.

Figure 1:
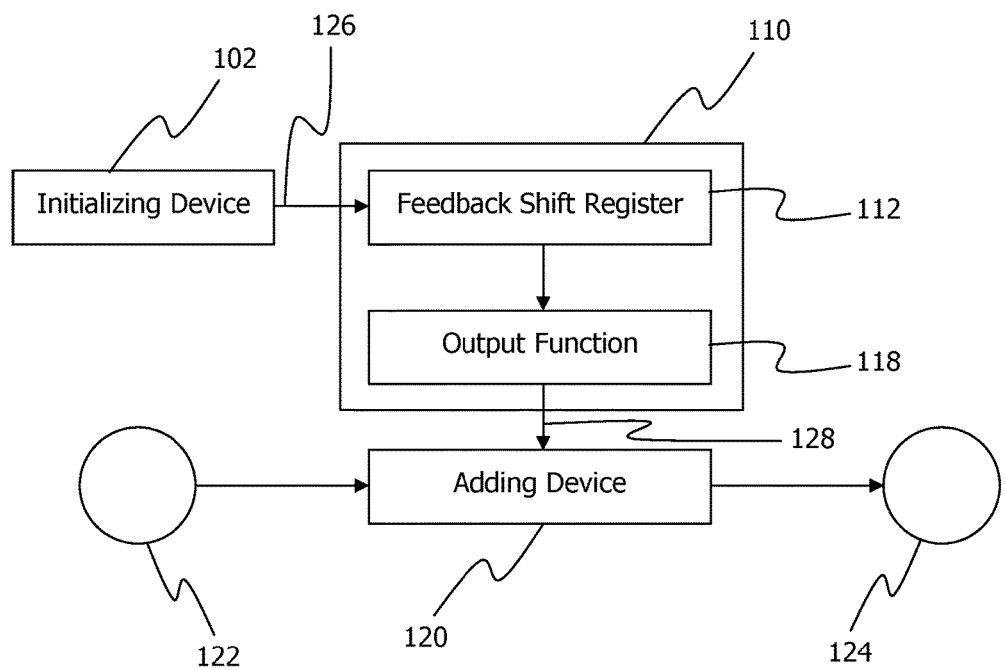
FIG. 1 schematically illustrates a block diagram of an exemplary system for ciphering or deciphering a data stream, which comprises a device for generating a keystream for ciphering or deciphering the data stream.

FIG. 1 schematically illustrates a system 100 for ciphering or deciphering a data stream. The system 100 includes an initializing device 102, a device 110 for generating a keystream, and an adding device 120. The generating device 110 includes a nonlinear feedback shift register (NLFSR) 112 implemented in a Galois configuration. The generating device 110 further includes an output function 118 coupled to the NLFSR 112. The implemented NLFSR 112 is initialized by the initializing device 102 based on a key 126 and optionally a fixed initial value (IV) prior to generating a keystream 128. The output function outputs the keystream 128 to the adding device 120. The adding device 120 combines the data stream from a data source 122 with the keystream 128. The resulting ciphered or deciphered data stream is provided to a data destination 124.

The key and/or the IV may be provided by external mechanisms, optionally in combination with existing techniques. For example, the key may be provided by a key management mechanism (e.g., LTE AKA according to 3GPP TS 33.401 or IKEv2 according to IETF RFC 4306). The IV may be provided by some external control mechanism, synchronization mechanism or signaling mechanism, e.g., associating an IV to the stream being processed. For example, if the stream being processed includes or is a data packet, the IV may comprise at least one of a packet identifier, a sequence number, an identifier for the sender of the packet, a cryptographic nonce, etc.

The system 100 is also referred to as a stream cipher. The system 100 may be implemented as a binary additive stream cipher, in which the keystream 128, a plaintext 122, and a ciphertext 124 are binary sequences. The keystream 128 is produced by the generating device 110 as a keystream generator taking the secret key 126 and the initial value (IV) as a seed. The generating device 110 generates the keystream 128 as a long pseudo-random sequence of zeros and ones. The ciphertext is then obtained by the bit-wise modulo-2 addition of the keystream 128 and the plaintext 122. The system 100 is advantageous for wireless applications as message size is not expanded and transmission bit-errors are not propagated (e.g., not spread to later bit positions in the ciphertext 124).

In a EU FP7 research project "eSTREAM", many stream ciphers including Grain and Trivium were designed following the belief that stream ciphers can be made both faster and smaller than block ciphers. In recent years, however, several block ciphers have been presented which are comparable in size to Grain and Trivium. Some well-known examples include KATAN, LED, KLEIN, PRESENT, Piccolo and TWINE. The throughput for ciphers is often given for 100 kHz clock frequency for comparability, since this is a typical clock frequency for RFID tags, notwithstanding that higher clock frequencies are often possible. For example, 3. Borghoff et al, "PRINCE, A low-latency block cipher for pervasive computing applications", Advances in Cryptology ASIACRYPT, Vol. 7658 of Lecture Notes in Computer Science, pp. 208-225, Springer 2012, report implementations reaching about 1 Gbps using slightly more than 3000 Gate Equivalents (GE) and 90 nm CMOS technology.

The device 110 defines a class of stream ciphers for higher data rates in a more compact design, e.g., with less than 3000 GE. The stream ciphers in the class comprise, as main components, the n-bit NLFSR 112 in a Galois configuration and the nonlinear output Boolean function 118 taking inputs from stages of the NLFSR 112.

The NLFSR 112 includes n register stages implemented in a Galois configuration. At least one register stage of the implemented n register stages is representable by at least one register stage of a linear feedback shift register (LFSR). A first subset of the implemented 17 register stages is representable by a second subset of a second NLFSR, wherein a number of register stages receiving a nonlinear feedback in the second NLFSR is greater than one and less than a number of register stages receiving a nonlinear feed-back in the implemented NLFSR. An input of the nonlinear output function 118 is coupled to at least two of the implemented n register stages of the NLFSR 112.

FIG. 2 shows a flowchart for a method of operating the generating device 110. In a step 202, the NLFSR 112 is operated according to its feedback functions. In a step 204 of the method 200, the nonlinear output function 118 outputs the keystream 128.

Figure 3:
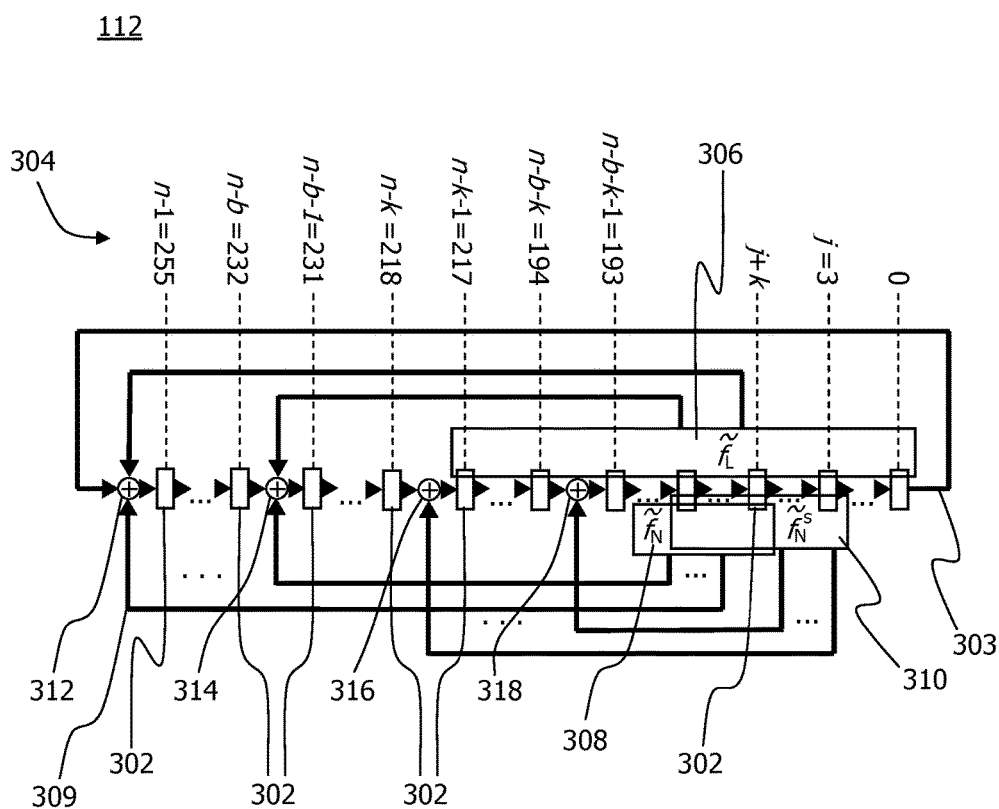

The following embodiment of the device 110 is an example for the class of stream ciphers. FIG. 3 schematically illustrates an embodiment of the NLFSR 112 in the device 110. The NLFSR 112 includes 17 register stages 302, e.g., n=256. Exemplary indices i=0 . . . n−1 of the register stages 302 are shown at reference 304.

A state of any feedback shift register (FSR) is a vector x of values of its state variables $x_i$. At each clock cycle, the next state of the FSR is determined from its current state by (e.g., simultaneously) updating the value of each register stage i to the value of the corresponding feedback function $f_i$ for each i in $\{0, 1, \ldots, n-1\}$.

A bit value $x_i$ of the i-th register stage 302 is shifted according to the trivial shift function $$f_i(x) = x_{i+1}$$

by one triangle (▶) in each cycle, including a cyclic shift 303 from the last register stage in shift direction $x_0$ (also referred to as output stage) to the first register stage $x_{n-1}$ (also referred to an input stage).

Addition "⊕" is implemented as a bit-wise XOR operation. Multiplication "." is implemented by a bit-wise AND operation. The Boolean functions $GF(2^8) \rightarrow GF(2)$ used for implementing the feedback in the NLFSR 112 and for defining the nonlinear output function 118 are represented using the Algebraic Normal Form (ANF), i.e., a polynomial in the Galois Field GF(2) of type $$f(x) = \sum_{i=0}^{2^n-1} c_i \cdot x_0^{i_0} \cdot x_1^{i_1} \cdot \ldots \cdot x_{n-1}^{i_{n-1}},$$

wherein $c_i \in \{0, 1\}$, $(i_0, i_1, \ldots, i_{n-1})$ is the binary expansion of the multi-index i, and $x = (x_0, x_1, \ldots, x_{n-1})$.

More specifically, the implemented NLFSR 112 includes the following update functions:

$$f_{255}(x) = x_0 \oplus x_{41} x_{70}$$

$$f_{251}(x) = x_{252} \oplus x_{42} x_{83} \oplus x_8$$

$$f_{247}(x) = x_{248} \oplus x_{44} x_{102} \oplus x_{40}$$

$$f_{243}(x) = x_{244} \oplus x_{43} x_{118} \oplus x_{103}$$

$$f_{239}(x) = x_{240} \oplus x_{46} x_{141} \oplus x_{117}$$

$$f_{235}(x) = x_{236} \oplus x_{67} x_{90} x_{110} \oplus x_{137}$$

$$f_{231}(x) = x_{232} \oplus x_{50} x_{159} \oplus x_{189} \qquad (1.1)$$

$$f_{217}(x) = x_{218} \oplus x_3 x_{32}$$

$$f_{213}(x) = x_{214} \oplus x_4 x_{45}$$

$$f_{209}(x) = x_{210} \oplus x_6 x_{64}$$

$$f_{205}(x) = x_{206} \oplus x_5 x_{80}$$

$$f_{201}(x) = x_{202} \oplus x_{78} x_{103}$$

$$f_{197}(x) = x_{198} \oplus x_{29} x_{52} x_{72} x_{99}$$

$$f_{193}(x) = x_{194} \oplus x_{12} x_{121} \quad (1.2)$$

All unmentioned updating functions are the trivial shift function. The trivial shift function is also included in above update functions (1.1) and (1.2) as the first term of the update functions.

The update functions (1.1) and (1.2) further include one or more terms correspond to feedback functions 306, 308 and 310. The feedback functions (1.1) include a linear part 306 denoted by $\widetilde{f_L}$ and a nonlinear part 308 denoted by $\widetilde{f_L'}$. For example, the update function $f_{255}$ includes a nonlinear part $x_{41} \cdot x_{70}$ shown at reference sign 309.

The feedback functions (1.2) include the nonlinear part $\widetilde{f_L'}$ shifted by k=38, which is denoted by $\widetilde{f_L'}^s$ and shown at reference sign 310. The feedback functions (1.2) include no linear part.

The linear $\widetilde{f_L}$ part and the nonlinear part $\widetilde{f_L'}$ are fed to adding points 312 to 314 that lead to some of the register stages n−1 to n−b−1 receiving the nonlinear feedback functions (1.1). A register breadth of the feedback (1.1) is in the embodiment shown in FIG. 3 equal to b=24.

The shifted nonlinear part $\widetilde{f_L'}^s$ is fed to adding points 316 to 318 that lead to some of the register stages n−1 to n−b−1 receiving the nonlinear feedback functions (1.2). A register breadth of the feedback (1.2) is, as a consequence of the parallel shift, equal to the register breadth of the feedback (1.1), e.g., equal to b=24.

The implemented NLFSR 112 includes 14 register stages receiving a nontrivial feedback, i.e., the NLFSR 112 is in a Galois configuration (of briefly, a Galois NLFSR). Furthermore, each of the groups (1.1) and (1.2) of feedback functions include 7 nontrivial feedback function and may thus be considered as Galois sub-configurations.

A feedback shift register including only one register stage receiving a nontrivial feedback is referred to as a Fibonacci configuration. A Galois-to-Fibonacci transformation is well-defined and unique for a given Galois NLFSR. The Galois-to-Fibonacci transformation may be implemented as a reverse of the Fibonacci-to-Galois transformation described by E. Dubrova in "A Transformation from the Fibonacci to the Galois NLFSRs", IEEE Transactions on Information Theory, vol. 55, 2009, pp. 5263-5271.

The Galois-to-Fibonacci transformation is briefly exemplified to provide a thorough understanding of the technique. Denoting the nontrivial parts of the (at least partly nonlinear) feedback functions $f_i$ of the n-bit NLFSR 112 implemented in the Galois configuration by g, the NLFSR 112 includes feedback functions $f_i$ according to:

$$f_{n-1}(x) = x_0 \oplus g_{n-1}(x),$$

$$f_{n-2}(x) = x_{n-1} \oplus g_{n-2}(x),$$

...

$$f_1(x) = x_2 \oplus g_1(x), \text{ and}$$

$$f_0(x) = x_1 \oplus g_0(x),$$

wherein the addition "$\oplus$" is implemented by the XOR operation.

The Galois-to-Fibonacci transformation is done by moving all functions $g_i(x)$ for i<n−1 to the feedback function $f_{n-1}(x)$ and increasing the indices of all variables of each $g_i(x)$ by (n−1)−i. Let $g_i(x(n-1)-i)$ denote the function $g_i(x)$ in which the indices of all variables are increased by (n−1)−i. The result of the Galois-to-Fibonacci transformation is the following NLFSR:

$$f_{n-1}(x) =$$
$$x_0 \oplus g_{n-1}(x) \oplus g_{n-2}(x<<1) \oplus \ldots \oplus g_1(x<<n-2) \oplus g_0(x<<n-1),$$
$$f_{n-2}(x) = x_{n-1},$$
...
$$f_1(x) = x_2, \text{ and}$$
$$f_0(x) = x_1$$

The transformation results, in general, in another NLFSR generating at the output stage the same set of sequences as the original NLFSR, if the following condition related to indices of the variables of the functions $g_i(x)$ in the Galois configuration is satisfied: For each i∈{t, t+1, ..., n−1}, the largest index of variables of the corresponding function $g_i(x)$ in the Galois configuration is smaller than or equal to t, wherein t is the maximal index such that $g_j(x)=0$ for all j∈{0, 1, ..., t−1}.

The NLFSR 112 has the property of being transformable to (and thus, particularly, being representable by) an n-bit LFSR generating the same sets of output sequences as the output stage $x_0$ of the NLFSR 112 by applying the Galois-to-Fibonacci transformation. This property is also referred to as the LFSR-representability. Nonlinear terms in the sum $$g_{n-1}(x) \oplus g_{n-2}(x<<1) \oplus \ldots \oplus g_1(x<<n-2) \oplus g_0(n<<-1) = f_L(x)$$

cancel out.

Figure 5:
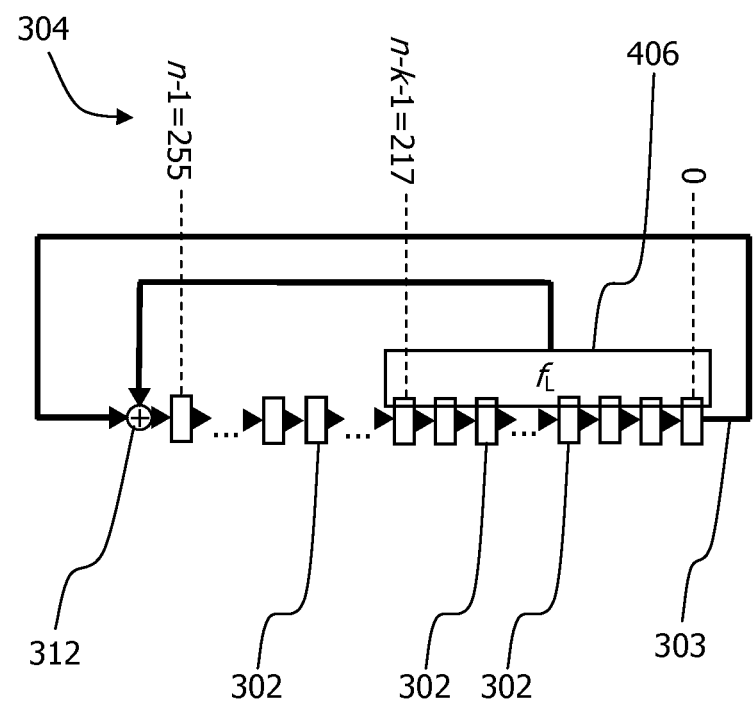
FIG. 5 schematically illustrates a block diagram of an exemplary linear feedback shift register (LFSR) representing at least one register stage of the implemented NLFSR of FIG. 3.

The Galois-to-Fibonacci transformation is unique and it can be easily computed. The transformation thus allows readily determining whether or not a given stream cipher including a NLFSR is an implementation of the device 110. If the given NLFSR is reducible to an LFSR 116, the given NLFSR is an implemented NLFSR 112. An exemplary LFSR 116 is illustrated in FIG. 5.

Figure 4:
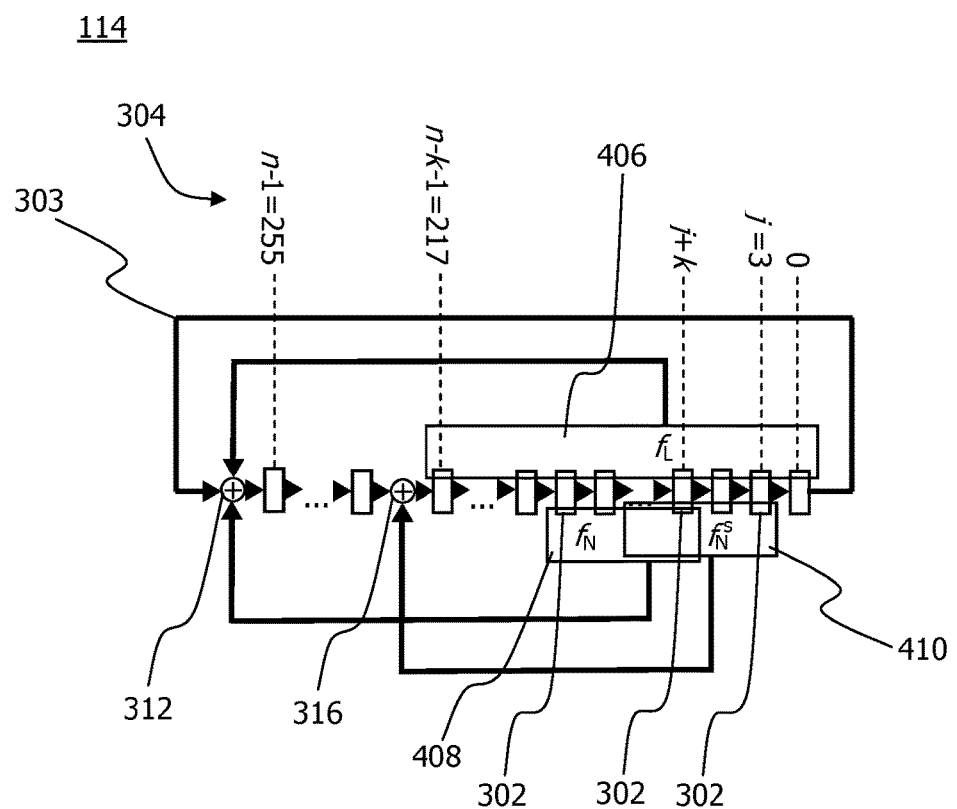
FIG. 4 schematically illustrates a block diagram of an exemplary second NLFSR representing a subset of the register stages of the implemented NLFSR of FIG. 3.

Furthermore, the NLFSR 112 has the property of being transformable to (and thus, particularly, being representable by) a second n-bit NLFSR including an even number of nontrivial feedback functions that is less than the feedback functions in the implemented NLFSR 112. In other words, the register breadth b is reducible to 1 in the second NLFSR. This property is also referred to as the NLFSR-representability. An exemplary second NLFSR 114 is illustrated in FIG. 4.

In the embodiment for the implemented NLFSR 112 shown in FIG. 3 and the second NLFSR 114 representing the implemented NLFSR 112, a number of register stages 217 and 255 receiving a nonlinear feedback in the second NLFSR 114 is two, i.e., greater than one and less than the number of 14 register stages 193, 197, 201, 205, 209, 213, 217, 231, 235, 239, 243, 247, 251, 255 receiving a nonlinear feedback in the implemented NLFSR 112.

The NLFSR-representability may be achieved in that the implemented NLFSR 112 is transformable to an n-bit NLFSR 114, which has only two nontrivial feedback functions of type $f_{n-1}(x_0, x_1, \ldots, x_{n-1}) = x_0 + f_L(x_1, \ldots, x_{n-1}) + f_N(x_1, \ldots, x_{n-1})$ shown at reference signs 406 and 408, and $f_{n-1-k}(x_0, x_1, \ldots, x_{n-1}) = x_{n-k} + f_N^s(x_{1-k}, \ldots, x_{n-1-k})$, shown at reference sign 410, wherein "−" is subtraction modulo n. E.g., the Galois-to-Fibonacci transformation is applied separately to the groups (1.1) and (1.2) of feedback functions. Due to the number of 2 nontrivial feedback functions, the resulting second NLFSR 114 is in a Galois configuration. More specifically, the second NLFSR 114 may be referred to as a concatenation of 2 Fibonacci configurations that are shifted by k register stages relative to each other.

The register stages n−b−1 to n−k of the implemented NLFSR 112 generate the same sets of sequences as the second NLFSR 114 at register stages n−1 to n−k, and the register stages n−b−k−1 to 0 of the implemented NLFSR 112 generate the same sets of sequences as the second NLFSR 114 at register stages n−k−1 to 0.

In the embodiments of the implemented NLFSR 112 and the second NLFSR 114 representing the implemented NLFSR 112, a first subset including the indices i=0, . . . , 193 and 218, . . . , 231 of the implemented n register stages is representable by a second subset i=24, . . . , 217 and 242, . . . , 255 of the second NLFSR 114.

The NLFSR-representability (transformability of the implemented NLFSR 112 to the second NLFSR 114) and the k-shift of a common nonlinear feedback function imply the LFSR-representability (transformability of the implemented NLFSR 112 to the LFSR 116), e.g., since $f_N(x_{1-k}, \ldots, x_{n-1-k})$ is movable to $f_{n-1}(x_0, x_1, \ldots, x_{n-1})$ so that the nonlinear feedback functions cancel each other.

In the specific embodiment, starting from the feedback function group (1.1), applying the Galois-to-Fibonacci transformations yields:

$f_{255}(x)$
$= x_0 \oplus x_{12} \oplus x_{47} \oplus x_{49} \oplus x_{115} \oplus x_{133} \oplus x_{213} \oplus x_{41}x_{70} \oplus x_{46}x_{87} \oplus$
$\oplus x_{52}x_{110} \oplus x_{55}x_{130} \oplus x_{62}x_{157} \oplus x_{74}x_{183} \oplus x_{87}x_{110}x_{130}x_{157}$. (2.1)

The linear part $f_L(x)$ of $f_{255}(x)$ includes 6 variables and corresponds to the following primitive polynomial of degree 256

$1 + x^{12} + x^{48} + x^{115} + x^{133} + x^{213} + x^{256}$. (3)

The indices of the 6 variables of the linear part $f_L(x)$ form the full positive difference set

{0, 12, 48, 115, 133, 213}.

The nonlinear part $f_N(x)$ is a bent function of 12 variables. Therefore, the nonlinear feedback function $f_{255}(x)$ is balanced, has nonlinearity $2^6 \cdot (2^{11} - 2^5) = 129024$, resiliency 5, and algebraic degree 4. Since the implemented NLFSR 112 and the second NLFSR 114 are equivalent (i.e., generate the same sequences in the first subset), the function $f_{231}(x)$ of the implemented NLFSR 112 has the same properties.

The indices of the 12 variables of the nonlinear part $f_N(x)$ form the full positive difference set

{41, 46, 52, 55, 62, 70, 74, 87, 110, 130, 157, 183}.

Similarly, starting from the feedback function group (1.2), applying the Galois-to-Fibonacci transformation yields the shifted version $f_N^s(x)$ shown at reference sign 410 of the nonlinear part $f_N(x)$ of $f_{255}(x)$:

$f_{217}(x)$
$= x_{218} \oplus x_3 x_{32} \oplus x_8 x_{49} \oplus x_{14} x_{72} \oplus x_{17} x_{92} \oplus x_{24} x_{119} \oplus x_{36} x_{145}$
$\oplus x_{49} x_{79} x_{92} x_{119}$. (2.2)

The "shifted" version $f_N^s(x)$ of $f_N(x)$, in which each variable $x_i$ is replaced by $x_{i-k}$, is added to the register stage $f_{217}$ of the second NLFSR 114 in order to cancel the effect of non-linearity, as illustrated in FIG. 4. As a result, the register stages n−k−1 to 0 of the second NLFSR 114 generate the linear sequence induced by the generator polynomial (3).

It is known that NLFSRs constructed in this way have the period $2^n - 1$, wherein n is the size of the register (E. Dubrova, "A scalable method for constructing Galois NLFSRs with period $2^n - 1$ using cross-joint pairs", IEEE Transactions on Information Theory, vol. 1, no. 59, pp. 703-709, 2013). Therefore, the second NLFSR 114 has the period $2^{256} - 1$. Since the implemented NLFSR 112 is equivalent to the second NLFSR 114, the implemented NLFSR 112 has the period $2^{256} - 1$ as well.

The LFSR-representability (transformability of the implemented NLFSR 112 to the LFSR 116) imposes a technical limitation, since most NLFSRs cannot be transformed to an LFSR. By way of example, the NLFSR 112 may be constructed by (e.g., randomly) generating indices and rapidly verifying the LFSR-representability, which may be repeated until the LFSR-representability is fulfilled.

Beyond the NLFSR-representability requiring the transformability from the implemented NLFSR 112 to the second NLFSR 114, the Galois-to-Fibonacci transformation allows verifying the LFSR-representability, i.e., the transformability to the LFSR 116.

By way of illustration, given a 4-bit NLFSR 112 with the feedback functions $f_3(x) = x_0 \oplus x_1 \oplus x_1 \cdot x_2$, $f_2(x) = x_3 \oplus x_0 \cdot x_1$, $f_1(x) = x_2$, and $f_0(x) = x_1$.

The Galois-to-Fibonacci transformation yields $f_3(x) = x_0 \oplus x_1 \oplus x_1 \cdot x_2 \oplus x_1 \cdot x_2 = x_0 \oplus x_1$ $f_2(x) = x_3$ $f_1(x) = x_2$ $f_0(x) = x_1$.

Since $x_1 \cdot x_2 \oplus x_1 \cdot x_2 = 0$, the NLFSR 112 reduces to an LFSR 116. Only if all nonlinear terms cancel each other after the transformation (which will happen only if each term occurs an even number of times in $f_{n-1}(x)$), the NLFSR 112 will get reduced to an LFSR 116.

An exemplary method of verifying the fulfilment of the conditions for a generating device 110 according to the present technique may comprise a first step of checking if the condition related to indices of the variables of the functions $g_i(x)$ for the Galois-to-Fibonacci transformation is satisfied. If the condition is satisfied, the method proceeds with a second step. Otherwise, the candidate NLFSR cannot be transformed to an LFSR 116 and the generated indices are, e.g., discarded.

In the second step, the Galois-to-Fibonacci transformation is performed. If the transformation results in an LFSR 116, the indices are selected for the NLFSR 112. Otherwise, the indices are discarded and the method is optionally repeated.

Figure 6:
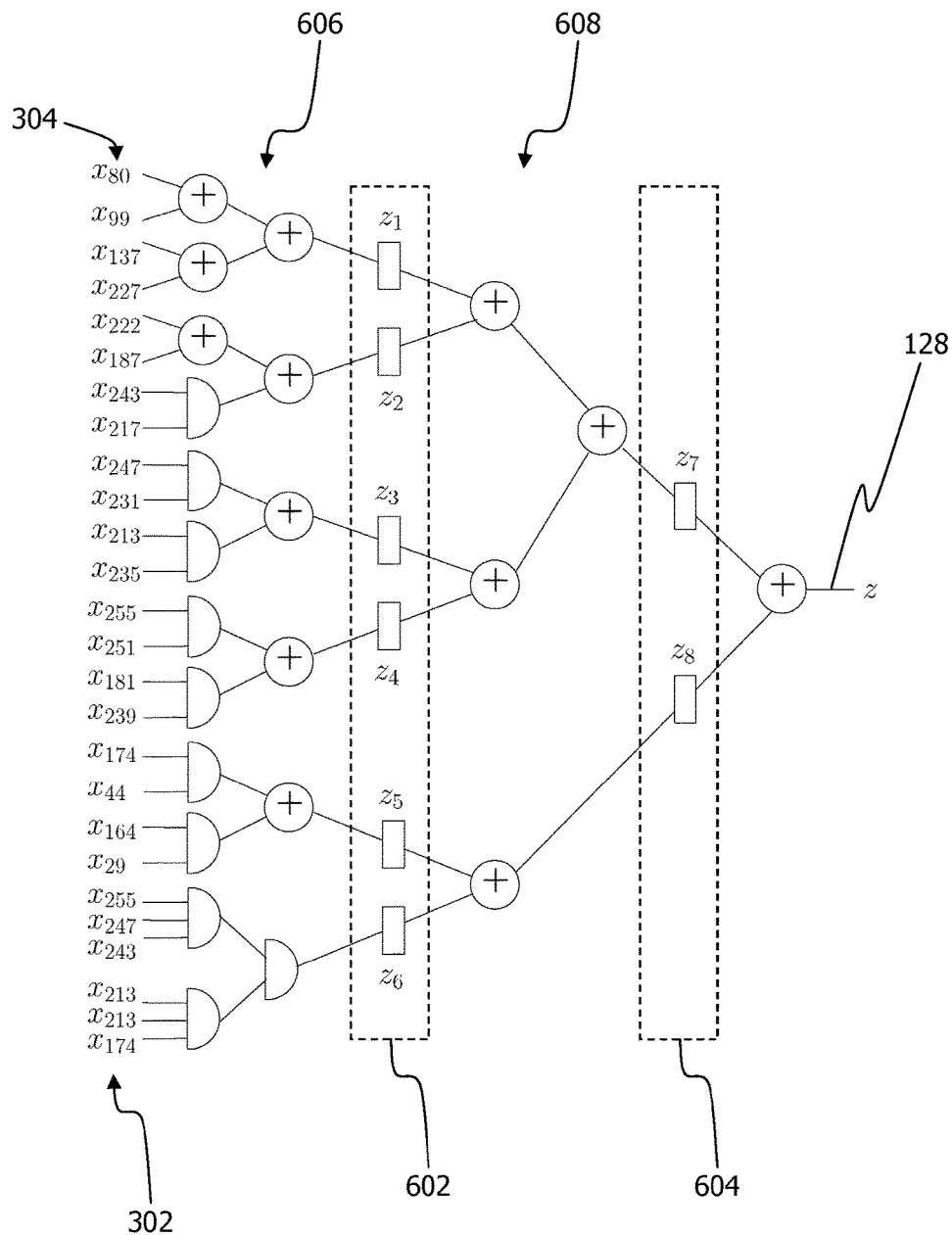
FIG. 6 schematically illustrates a block diagram of a nonlinear output function implementable in the device of FIG. 1.

FIG. 6 schematically illustrates an embodiment of the nonlinear output function 118 for the generating device 110. All most-biased linear approximations of the output Boolean function 118 should take inputs only from the register stages 302 of the implemented NLFSR 112, which have an equivalent register stage in the transformed second NLFSR 114.

In the embodiment illustrated in FIG. 6, the nonlinear output function 118 is specified as follows:

$$z(x) = x_{80} \oplus x_{99} \oplus x_{137} \oplus x_{227} \oplus x_{222} \oplus x_{187} \oplus x_{243}x_{217} \oplus x_{147}x_{231}$$
$$\oplus x_{213}x_{235} \oplus x_{255}x_{251} \oplus x_{181}x_{239} \oplus x_{174}x_{44} \oplus x_{164}x_{29}$$
$$\oplus x_{255}x_{247}x_{243}x_{213}x_{181}x_{174}. \quad (4)$$

The nonlinear output function z(x) includes a linear part of 6 variables and a bent function of 14 variables. Therefore, z(x) is balanced and has nonlinearity $2^6 \cdot (2^{13} - 2^6) = 520192$, resiliency 5 and algebraic degree 6.

In the nonlinear output function 118, 15 out of 20 indices of variables are taken from the following full positive difference set:

{255, 247, 243, 227, 222, 213, 187, 181, 174, 164, 137, 99, 80, 44, 29}.

In seven double-products of the nonlinear output function 118, the difference between the first and the second indices of variables is taken from the following full positive difference set:

{26, 16, 22, 4, 58, 130, 135}.

Independent of details of the nonlinear output function 118 and its hardware implementation, a minimum number of parallelizable computational steps of the nonlinear output function 118 may be less than or equal to 3. E.g., the implementation of the nonlinear output function 118 schematically illustrated in FIG. 6 includes 2 intermediary stages 602 and 604 for computing groups of concatenated functions $z_1$ to $z_6$ and $z_7$ to $z_8$, respectively:

$$z_1(x) = x_{80} \oplus x_{99} \oplus x_{137} \oplus x_{227}$$

$$z_2(x) = x_{222} \oplus x_{187} \oplus x_{243}x_{217}$$

$$z_3(x) = x_{247}x_{231} \oplus x_{213}x_{235}$$

$$z_4(x) = x_{255}x_{251} \oplus x_{181}x_{239}$$

$$z_5(x) = x_{174}x_{44} \oplus x_{164}x_{29}$$

$$z_6(x) = x_{255}x_{247}x_{243}x_{213}x_{181}x_{174}, \text{ and} \quad (5.1)$$

$$z_7(x) = z_1(x) \oplus z_2(x) \oplus z_3(x) \oplus z_4(x)$$

$$z_8(x) = z_5(x) \oplus z_6(x). \quad (5.2)$$

The result of the stage 604 is combined to the output value z:

$$z(x) = z_7(x) \oplus z_8(x). \quad (5.3)$$

Thus, the logical operations (5.1) leading to the stage 602 can be performed in parallel, as shown at reference sign 606. Similarly, the logical operations (5.2) leading to the stage 604 can be performed in parallel, as shown at reference sign 608.

As a consequence of the pipelined binary tree configuration, the computation of the nonlinear output function 118 is delayed by only two clock cycles. While the pipelining increases the area by 8 flip-flops, it allows increasing the throughput 1.7 times. In many applications, the substantial gain in throughput outweighs minor increases in area and latency.

In order to further reduce the propagation delay of the generating device 110, the De-Morgan rules are applied to modify the ANFs (1.1) and (1.2) of the feedback functions $f_{235}$ and $f_{197}$, respectively, of the implemented NLFSR 112 as follows:

$$f_{235}(x) = x_{236} \oplus x_{67}x_{90}x_{110}x_{137} = x_{236} \oplus ((x_{67}x_{90})' + (x_{110}x_{137})')'$$

$$f_{197}(x) = x_{198} \oplus x_{29}x_{52}x_{72}x_{99} = x_{198} \oplus ((x_{29}x_{52})' + (x_{72}x_{99})')'$$

wherein x' stands for the Boolean complement of x (defined as $x' = x \oplus 1$), and "+" stands for the Boolean OR operation. Below Table reveals that, in CMOS technology, a NAND operation or a NOR operation are much smaller and faster than an AND operation. Therefore, both the area and the delay can be further reduced by replacing a 4-input AND as shown in the stage 606 (in the bottom two gates in FIG. 6).

| Gate | Area, μm² | Area, GE | Delay, ps |
| --- | --- | --- | --- |
| 2-input NAND | 3.7 | 1 | 33 |
| 2-input NOR | 3.7 | 1 | 57 |
| 2-input AND | 5 | 1.4 | 87 |
| 3-input AND | 7 | 1.9 | 95 |
| 2-input XOR | 10 | 2.7 | 115 |
| flip-flop | 19 | 5.1 | 221 |

The initializing device 102 initializes the generating device 110 (and thus the cipher). Let $k_i$ denote the bits of a key $k_i$, $0 \leq i \leq 127$, and the initial values $IV_i$ denote the bits of the initialization value IV, $0 \leq i \leq 95$. The key and the IV bits are loaded into the NLFSR 112 as follows:

$$x_i = k_i, 0 \leq i \leq 127$$

$$x_i = IV_{i-128}, 128 \leq i \leq 223$$

$$x_i = 1, 224 \leq i \leq 254$$

$$x_i = 0, i = 255$$

The initialization phase further includes clocking the generating device 110 n times and XORing the produced output bit of the keystream 124 with the register stages $x_{n-1}$ and $x_{n-k-1}$, e.g., $x_{255}$ and $x_{217}$. Thus, in the initialization phase, the feedback functions $f_{255}(x)$ and $f_{217}(x)$ are given by $$f_{255}(x) = x_0 \oplus x_{41}x_{70} \oplus z(x)$$

$$f_{217}(x) = x_{218} \oplus x_3x_{32} \oplus z(x)$$

After initialization, the generating device 110 is clocked for three more cycles due to the pipelining of the nonlinear output function 118, and optionally for additional logic required for switching between the initialization phase and a keystream generation phase, as explained with reference to FIG. 7. Then, the keystream 128 is produced.

Figure 7:
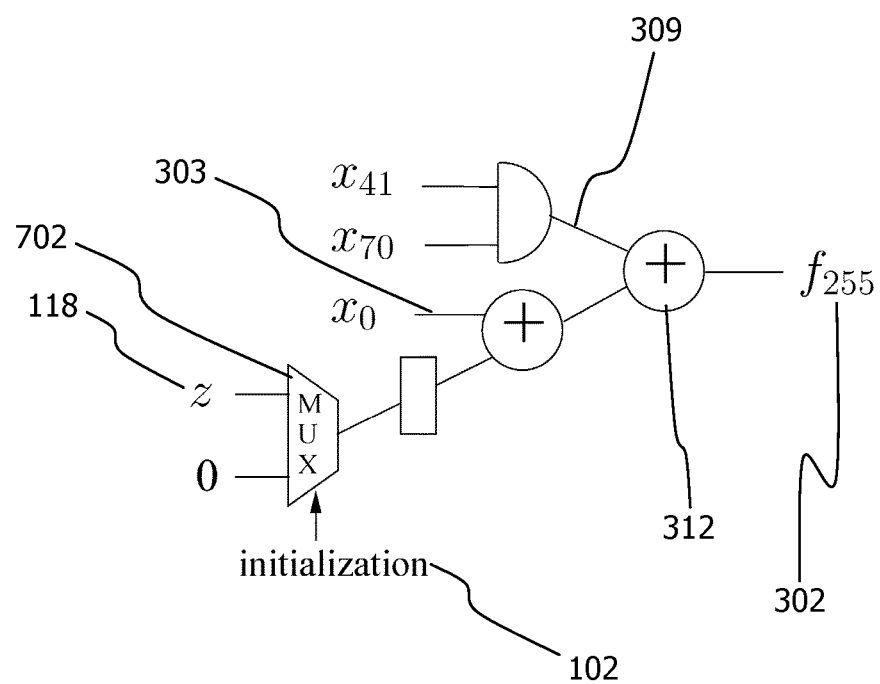
FIG. 7 schematically a block diagram of a nonlinear feedback function switchable for initialization and operation of the implemented NLFSR of FIG. 3.

FIG. 7 shows a logic 700 for switching between an initialization phase and a keystream generation phase can be implemented for $f_{255}$ without increasing the critical path. A circuit for the function $f_{217}$ is similar. The nonlinear output function 118 is multiplexed and pipelined. While a function describing a regular multiplexer (MUX) is $$a \cdot b + a' \cdot c,$$

a multiplexer 702 in which one input is fixed to 0 can be implemented as $$a \cdot b + a' \cdot 0 = a \cdot b.$$

Therefore, the delay of the MUX 702 is equal to the delay of an AND, which is smaller than the delay of an XOR. The modified switching scheme thus increases the latency by only one additional clock cycle.

After these modifications, the NLFSR 112 requires 12 2-input ANDs, 4 2-input NANDs, 2 2-input NORs, 19 2-input XORs and 256 flip-flops to be implemented. The nonlinear output function 118 requires 8 2-input ANDs, 2 3-input ANDs, 13 2-input XORs and 8 flip-flops. The additional logic for switching between the initialization and the keystream generation phases requires 2 ANDs, 2 XORs and 2 flip-flops.

If 90 nm CMOS technology for implementing this NLFSR 112 (cf. gate parameters in above Table) is used, the area and the propagation delay of the NLFSR 112 can be approximated based on the area of (22×2-input ANDs+2×3-input ANDs+4×2-input NANDs+2×2-input NORs+34 XORs+266 flip-flops)=5540 µm²=1497 GE, and the delay of (2 XORs+flip-flop)=451 ps.

Thus, the embodiment of the device 110 supports data rates of up to 2.22 Gbits/sec below 1500 GE. Its latency is 232 ns (estimated as (256+256+3) clock cycles×451 ps). It can be parallelized to produce up to 4 bits per clock cycle, because three bits after each stage which is updated using the feedback (1.1) and (1.2) are not used, neither as state variables nor in the output function 118. In below Table, k is the degree of parallelization (i.e., the number of bits generated per one clock cycle).

| | Presented | | | |
|---|---|---|---|---|
| k | Area, $A_1$, GE | Throughput, $T_1$, Gbits/s | Latency, $L_1$, ns | Security, bits |
| 1 | 1497 | 2.22 | 232 | 128 |
| 2 | 1680 | 4.44 | 116 | 128 |
| 4 | 2045 | 8.88 | 59 | 128 |

For a comparison, the area and propagation delay of the stream cipher Grain-128 are given by (M. Hell et al., "The Grain family of stream ciphers", New Stream Cipher Designs: The eSTREAM Finalists, LNCS 4986, pp. 179-190, 2008):

Area of (22 ANDs+34 XORs+258 flip-flops)=5352 µm²=1446 GE

Delay of (AND+4 XORs+flip-flop)=768 ps.

Here, a logic similar to the logic 700 is assumed for switching between the initialization and the operational phases. Otherwise, the delay of Grain-128 is considerably higher. Grain-128 can be parallelized to produce up to 32 bits per clock cycle. For the degree of parallelization one, its latency is 296 ns (computed as (128+256+1) clock cycles× 768 ps).

| | Grain-128 | | | | | | |
|---|---|---|---|---|---|---|---|
| k | Area, $A_2$, GE | Throughput, $T_2$, Gbits/s | Latency, $L_2$, ns | Security, bits | $\frac{A_1 - A_2}{A_1}$ | $\frac{T_1 - T_2}{T_2}$ | $\frac{L_1 - L_2}{L_2}$ |
| 1 | 1446 | 1.30 | 296 | 128 | 3.4% | 71% | −22% |
| 2 | 1578 | 2.60 | 147 | 128 | 6.1% | 71% | −22% |
| 4 | 1842 | 5.20 | 47 | 128 | 9.9% | 71% | −22% |

Performance parameters of the stream cipher Trivium include (C. Cannierè and B. Preneel, "Trivium", New Stream Cipher Designs: The eSTREAM Finalists, LNCS 4986, pp. 244-266, 2008):

Area of (3 ANDs+11 XORs+288 flip-flops)=5597 µm²=1513 GE

Delay of (AND+2 XORs+flip-flop)=538 ps.

Trivium can be parallelized to produce up to 64 bits per clock cycle. For the degree of parallelization one, its latency is 663 ns (computed as (80+4×288) clock cycles×538 ps).

| | Trivium | | | | | | |
|---|---|---|---|---|---|---|---|
| k | Area, $A_3$, GE | Throughput, $T_3$, Gbits/s | Latency, $L_3$, ns | Security, bits | $\frac{A_1 - A_3}{A_1}$ | $\frac{T_1 - T_3}{T_3}$ | $\frac{L_1 - L_3}{L_2}$ |
| 1 | 1513 | 1.86 | 663 | 80 | −1.1% | 19% | −65% |
| 2 | 1547 | 3.72 | 332 | 80 | 7.9% | 19% | −65% |
| 4 | 1614 | 7.43 | 166 | 80 | 21.0% | 19% | −65% |

Above Tables summarize the area and throughput for the embodiment of the device 110 and the two conventional ciphers Grain-128 and Trivium, compared for the degrees of parallelization 1, 2 and 4. For the degree of parallelization 1, the embodiment of the device 110 is 3.4% larger and 71% faster than Grain-128. Its latency is 22% less than the one of Grain-128. Compared to Trivium, the embodiment of the device 110 is 1.1% smaller, 19% faster, and has 65% less latency.

Overall, the embodiment of the device 110 is the fastest among the designs below 1500 GE.

As shown in what follows, the class of ciphers according to the present technique is also the most secure among the three ciphers compared above.

To this end, a security analysis of the embodiment of the device 110 is given. Both attacks on the running keystream 128 and attacks on the initialization procedure are discussed.

Attacks using linear approximations were successful against the initial version of Grain, resulting in key recovery attacks. Being an NLFSR with a nonlinear output function, the present technique has similarities with Grain. Consequently, the resistance against these attacks is determined.

The security against linear attacks is analyzed using the equivalent Fibonacci configuration LFSR 116 of the implemented NLFSR 112. There are no linear terms in any shift register stages 302 that do not have an equivalent in both configurations 112 and 116, so the analysis is valid also for the implemented NLFSR 112 in the Galois configuration.

For clarity of the presentation, the register is divided into two separate parts. The state variables in the nonlinear part (register stages n−1 to n−k in FIG. 3) are denoted by b and the state variables in the linear part (register stages n−k−1 to 0 in FIG. 3) are denoted by s. Furthermore, let B and S denote the size of the nonlinear part and the linear part of the shift register, respectively. Thus, $$b_i = s_{i+S} \quad 0 \le i < B. \tag{6}$$

The linear stages $s_i$, $0 \le i < S$ satisfy the linear recurrence relation $$s_{i+256} = s_i + s_{i+43} + s_{i+123} + s_{i+141} + s_{i+208} + s_{i+244}$$

which is induced by the polynomial (3). Defining the bias E of an approximation as $$\varepsilon = 2 \cdot Pr(A=B) - 1,$$

which is short-handedly written as $$A \stackrel{\varepsilon}{=} B,$$

the nonlinear output function 118 can be approximated with a linear function so that $$z(t) \stackrel{\varepsilon_1}{=} \bigoplus_i b_0(t + \phi_i) \oplus \bigoplus_j s_0(t + \theta_j). \tag{7}$$

The number of b-variables in the output function 118 is denoted by $w_b(z)$, i.e., $0 \le i < w_b(z)$ in (7).

Similarly, the nonlinear feedback function can be approximated by a linear function in bits from s since there are no b-variables in the feedback in order for the nonlinear compensation to $s_{s-1}$ to work properly.

Thus, $$b_{B-1}(t+1) = b_0(t+B) \stackrel{\varepsilon_2}{=} \bigoplus_k s_0(t + \mu_k). \tag{8}$$

Combining Eqs. (7) and (8), the output can be written as a sum of only variables from the linear part b of the shift register:

$$z(t) \stackrel{\varepsilon_1}{=} \bigoplus_i b_0(t + B - (B - \phi_i)) \oplus \bigoplus_j s_0(t + \theta_j) \tag{9}$$

$$\stackrel{\varepsilon_1 \varepsilon_2^{w_b(z)}}{=} \bigoplus_i \bigoplus_k s_0(t + \mu_k - (B - \phi_i)) \oplus \bigoplus_j s_0(t + \theta_j), \tag{10}$$

wherein the piling-up lemma has been used to combine linear approximations.

Thus, an output variable can always be written as a biased sum of s-variables, which in turn satisfy a linear recurrence relation. Denoting the weight of this recurrence relation by w(LR), a distinguishing attack has total bias equal to $$\varepsilon_{tot} = \left(\varepsilon_1 \varepsilon_2^{w_b(z)}\right)^{w(LR)}. \tag{11}$$

Thus, it is clear that the complexity of the attacks relies on the biases of the two approximations and on the number of b-variables that are used in the linear approximation of the output function. By inspection:

$\varepsilon_1 = 2^{-7}$ and $\varepsilon_2 = 2^{-6}$ and $w_b(z) = 6$ for all biased linear approximations.

From this follows that the approximation (10) has bias $2^{-43}$, which makes it inefficient to mount attacks similar to the one described by C. Berbain et al. in "Cryptanalysis of Grain", Fast Software Encryption 2006 [M. Robshaw, ed.], vol. 4047 of Lecture Notes in Computer Science, pp. 15-29, Springer, 2006.

Also, if using a weight 3 multiple of the linear recurrence relation, the number of samples needed would be in the order of $1/\varepsilon_{tot}^2 = 2^{43 \cdot 3 \cdot 2} = 2^{172}$ with distance $2^{218/2} = 2^{109}$ between first and last keystream bit in each sample (D. Wagner, "A generalized birthday problem", in Advances in Cryptology—CRYPTO 2002 [M. Yung, ed.), vol. 2442 of Lecture Notes in Computer Science, pp. 288-303, Springer, 2002; and 3. D. Golic, "Computation of low-weight parity check polynomials", Electronic Letters, vol. 32, no. 21, pp. 1981-1982, 1996).

Algebraic attacks have been proved very efficient against nonlinear combiners with or without memory. The success of the attack is due to the linearity of the shift register and the fact that the output function is the only nonlinear part of the register. It is always possible to write equations describing output bits using initial state bits. Due to the linearity of the shift register, the algebraic degree of these equations will never exceed the degree of the output function. With enough equations, linearization, or other more advanced methods can be used to recover the internal state. Moreover, annihilators can be used to lower the degree of the functions even more. With a part of the state being nonlinearly updated, these attacks are no longer applicable since several nonlinear register stages are used in the output function. The degree of the equations in initial state bits will increase and is not limited by the degree of the output function.

Time-Memory-Data Trade-Off (TMTO) attacks on stream ciphers can be divided into two categories, those that attempt to reconstruct the internal state and those that attempt to recover the key. The algorithms used in the latter attacks are the same as those in the former, they just use a different one-way function as target of the attack. The algorithm used in J. Golic, "Cryptanalysis of alleged A5 stream cipher" in Advances in Cryptology—EUROCRYPT 1997 [W. Fumy, ed.], vol. 1233 of Lecture Notes in Computer Science, pp. 239-255, Springer, 1997; and S. Babbage, "A space/time tradeoff in exhaustive search attacks on stream ciphers" in European Convention on Security and Detection, no. 408 in IEEE Conference Publication, 1995, records input/output combinations and uses enough data in order to have a collision with a recorded value. The tradeoff curve is given by TM=N, T=D, and P=M=N/D.

The algorithm used by A. Biryukov and A. Shamir in "Cryptanalytic time/memory/data tradeoffs for stream ciphers", Advances in Cryptology—ASIACRYPT 2000 [T. Okamoto, ed.], vol. 1976 of Lecture Notes in Computer Science, pp. 1-13, Springer, 2000, instead creates tables similar to those used by M. Hellman in "A cryptanalytic time-memory trade-off", IEEE Transactions on Information Theory, vol. IT-26, pp. 401-406, July 1980, and has the trade-off given by $TM^2D^2 = N^2$, $1 \le D^2 \le T$ and P=N/D.

Both algorithms use the observation that an increased amount of data can lower the precomputation time. Since the size of the internal state is $2^{2k}$, it is clear that recovering the internal state is not possible with $T < 2^k$ and $M < 2^k$ using any of the algorithms. On the other hand, recovering the key would be possible with, e.g., $T = 2^{112}$, $M = 2^{112}$ and $D = 2^{56}$ but will require a precomputation time of $P = 2^{168}$, which is arguably too large to be interesting if the key size is 128 bits.

Ad hoc improvements to the TMTO attacks can also be considered, wherein recovering a subset of bits will allow recovering other bits as well using algebraic relations in the output function. The success of these attacks is specific to the design, in particular to the output function 118 chosen in the design. The idea, as proposed by M. J. Mihaljevic et al. in "Internal state recovery of Grain-v1 employing normality order of the filter function", IET Information Security, vol. 6, no. 2, pp. 55-64, 2012; and M. J. Mihaljevic et al. in "Generic cryptographic weakness of k-normal Boolean functions in certain stream ciphers and cryptanalysis of Grain-128", Periodica Mathematica Hungarica, vol. 65, no. 2, pp. 205-227, 2012, and demonstrated on the Grain family of stream ciphers, is to identify a subset of state bits, which together with some output bits can be used to determine the remaining state bits.

Using this observation, the TMTO attack can be improved by only considering the subset of state bits needed for recovering the rest. The normality of the output Boolean function will here play an important role as it determines how many shift register bits need to be fixed in order to recover remaining state bits. The normality order of this function in the design is 7, which means that 14−7=7 variables need to be fixed in order to get linear equations for the recovery. The Galois configuration of the shift register, together with the fact that not all bits have a corresponding bit in the Fibonacci equivalent configuration, complicates this attack. And even if hypothetical improvements over the generic TMTO attacks were possible using this approach, the required memory complexity of such an attack would far exceed that of brute force, and a parallelized brute force is likely to be much more efficient (D. J. Bernstein, "Understanding brute force." eSTREAM, ECRYPT Stream Cipher Project, Report 2005/036, 2005).

The complexity of the initialization function does not affect the attack complexities in the TMTO attacks. So-called "chosen IV" attacks include attacks that depend on the initialization function. In a "chosen IV" scenario, the adversary can choose the initialization vector used in the initialization step. This is the basis for the "Cube attack" (I. Dinur et al., "Cube Attacks on Tweakable Black Box Polynomials", Advances in Cryptology—EUROCRYPT 2009 [A. Joux, ed.], vol. 5479 of Lecture Notes in Computer Science, pp. 278-299, Springer, 2009) and AIDA attack (M. Vielhaber, "Breaking ONE.FIVIUM by AIDA, an Algebraic IV Differential attack", http://eprint.iacr.org/2007/413/) and can lead to key recovery, if the initialization is not carefully designed.

The number of iterations in the initialization should be chosen such that all key and IV bits affect the keystream bits in a complex way.

To determine the resistance against these types of attack, maximum degree monomial tests have been performed. Any keystream bit can be written as a function of key and IV bits $$z_i = f_i(k_0, \ldots, k_{127}, iv_0, \ldots, iv_{95}). \quad (12)$$

All key bits are fixed to zero and a subset of the IV bits are fixed as well. Thus, running through all possible combinations of the non-fixed bits, the truth table of the function $f_1$ is obtained, which can in turn be used to compute the ANF. This will lead to a d-monomial test in which the presence of monomials of degree d could be checked and compared to the expected number for a random Boolean function.

Intuitively, the maximum degree monomial only exists if all bits have been properly mixed by the initialization function. Hence, the discussion focuses on this monomial. The total number of bits that can be used is 96 requiring a complexity of $2^{96}$ in order to determine the presence of the monomial $iv_0, \ldots, iv_{95}$. Since this is not feasible, the test is adopted in order to find a monomial with manageable degree and that will be absent for as many initialization rounds as possible.

The algorithm starts with just a few bits and exhaustively finds the monomial that is absent the maximum number of rounds. Then it greedily adds one more bit to the set and continues. All non-used key and IV bits are set to zero. For a conservative estimate, the algorithm is allowed to use also key bits. This turns the "chosen IV" attack into a less powerful non-randomness detector since an attacker is not assumed to be able to choose key bits.

Figure 8:
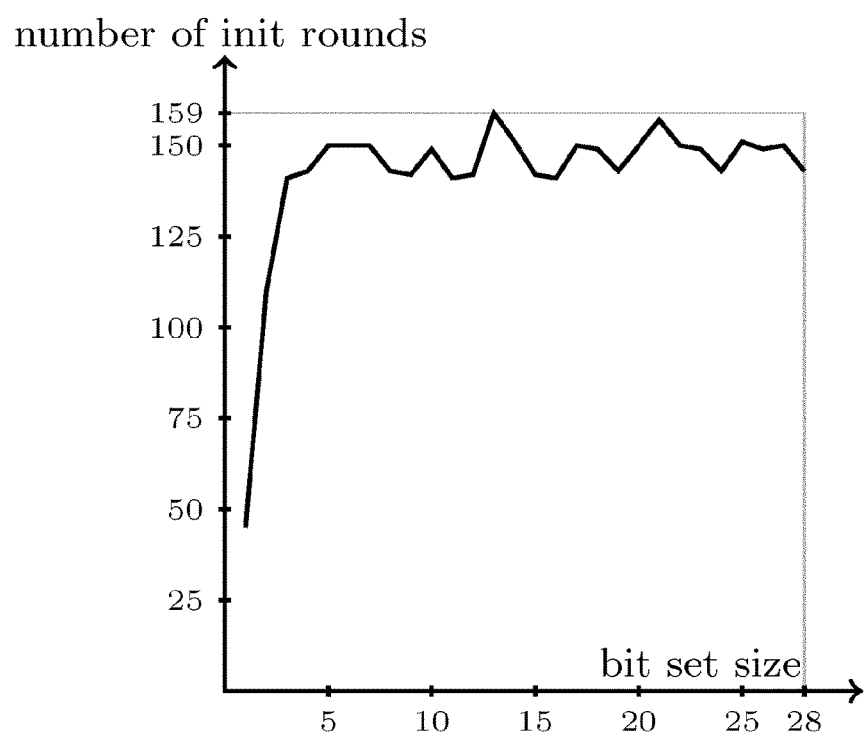
FIG. 8 shows an exemplary diagram of a maximum number of initialization rounds that do not pass a maximum degree monomial test for a given monomial degree.

The diagram 800 in FIG. 8 shows the number of initialization rounds that can be broken using a particular degree (bit set size) for the monomial. By using dedicated hardware it would be possible to test a larger number of IV bits, i.e., larger degree monomials. However, from the results in diagram 800, the number of initialization steps deduced is adequate to resist these types of "chosen IV" attacks. With 159 rounds that fail the non-randomness test, the proposed 256 rounds provide an adequate security margin. For comparison, same test applied to Grain-128 can find non-randomness in about 240 initialization rounds with bit set size 23. Using bit set size of 40, the full Grain-128 initialization using 256 shows non-randomness.

Notwithstanding above discussion focused on an embodiment for the device 110, the security achievable by the device 110 in general is not very dependent on the indices used for the implemented NLFSR 112 including its feedback functions and for the nonlinear output function 118. Rather, indices chosen such that they form a full positive difference set (J. D. Golic, "On the security of nonlinear filter generators", Fast Software Encryption, Lecture Notes in Computer Science, Vol. 1039, 1996, pp. 173-188) generically achieve the advantageous level of assurance.

Since the security depends on the properties of the functions, namely the nonlinearity and the resiliency (which determine the attack complexity for linear approximations), and the algebraic degree (which determines the complexity for algebraic attacks and for the "chosen IV" attack described above), the level of assurance achieved by an embodiment of the device 110 is controllable.

Eq. (11) above gives the total bias for linear approximations, which depends on the nonlinearity of the Boolean functions as well as the resiliency for the output function 118. A straight forward way of constructing an embodiment of the device 110 includes: randomly picking 2 Boolean functions (one feedback function and one output function) that are implementable using O(n) gates; and checking the total bias according to Eq. (11). If the bias is small enough, the functions can be used. What is "small enough", may be selected depending on the application. E.g., a reasonable value is $2^{k/2}$, since a distinguisher would then need $2^k$ samples. Some security margin on top of this is also preferred and considered good practice. A further step checks if the cipher is resistant to "chosen IV" attacks, as described above. The functions are then used to implement the device 110 and the maximum number of initialization rounds that can be attacked should be well below the number of rounds used in the device 110. Thus, the resistance against this attack depends on the number of initialization rounds, how the initialization is performed and the Boolean functions (including the degree of the functions).

The TMTO attack basically depends on the state size n. Even though some indices would be better than other, the resulting attack is not of much interest anyway since the memory required would be too large and the improvements are marginal.

Thus, the indices can easily be changed without effecting security very much. Even picking random indices largely results in acceptable assurance, particularly if the indices are such that all most-biased linear approximations of the non-linear output function 118 have indices in register stages that have an equivalent the second NLFSR 116. Function choice allows controlling the level of assurance in general. Determining all most-biased linear approximations of the Boolean function $f_N$ is efficiently implemented, e.g., using a Walsh Transform of the Boolean function $f_N$.

Figure 9:
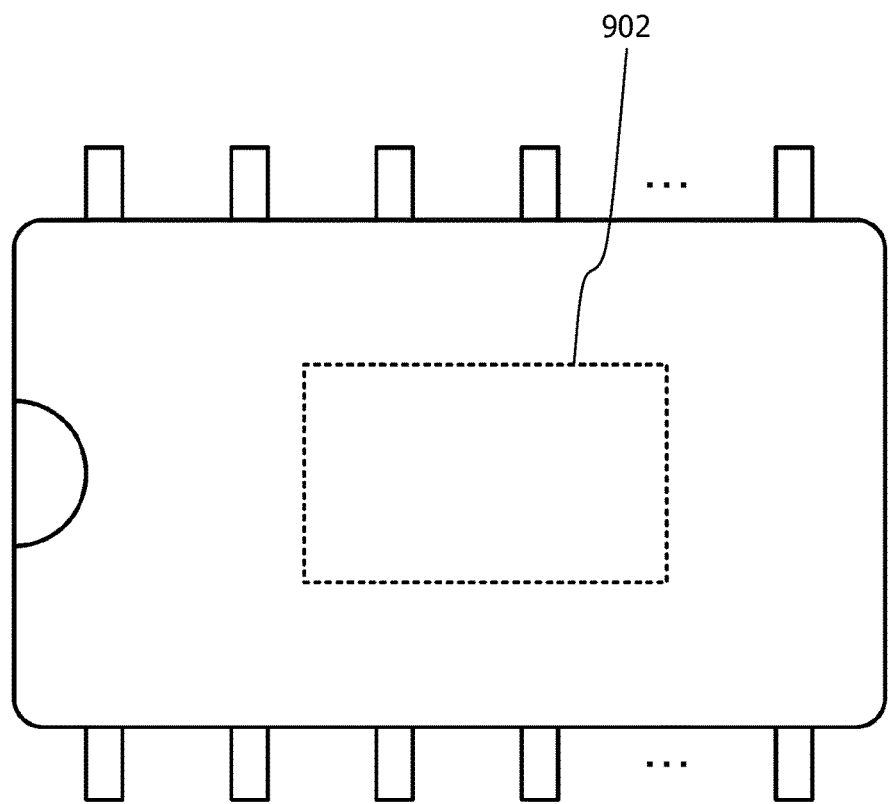
FIG. 9 schematically illustrates an integrated circuit implementing the device of FIG. 1.

The device 110 or the system 100 may be implemented in an Integrated Circuit (IC) 900, e.g. as part 902 of a chipset, which is schematically illustrated in FIG. 9.

Figure 10:
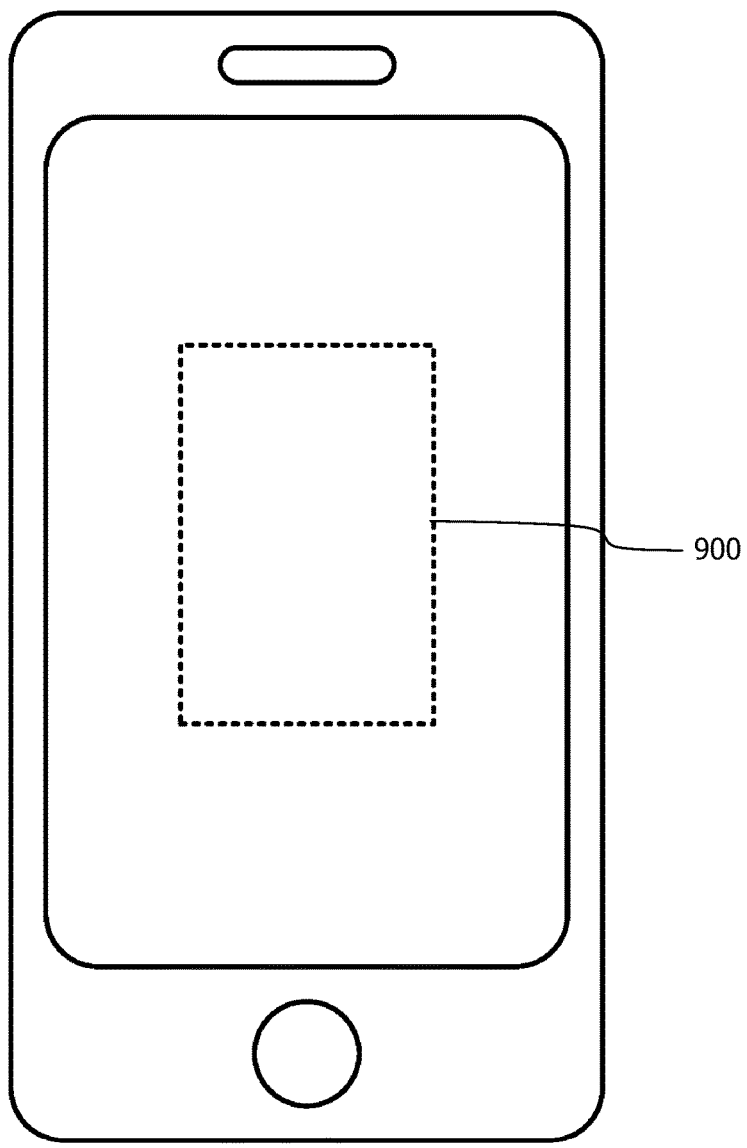
FIG. 10 schematically illustrates a mobile terminal comprising the integrated circuit of FIG. 9.

Alternatively or in addition, the device 110 or the system 100 may be implemented in a mobile terminal 1000 schematically illustrated in FIG. 10. By way of example, the IC 900 may be included in the mobile terminal 1000. The mobile terminal 1000 may be a mobile phone, a User Equipment (UE), a smartphone, a tablet, a computer or a Machine-to-Machine (M2M) device (such as a sensor).

Furthermore, the device 110 or the system 100 may be comprised in an access node of a radio access network. The access node may be a radio base station, BTS, RBS, NodeB, eNodeB or an access point of a WLAN according to the IEEE 802.11 standard family.

As has become apparent from above description of exemplary embodiments, a class of secure stream ciphers, e.g. for 5G wireless communication systems, is provided. According to above evaluation, the presented ciphers are the fastest and the most secure among ciphers below 1500 GE, including prior art algorithms Grain-128 and Trivium. Embodiments of the technique achieve a guaranteed long period of $2^{256}-1$.

The technique allows implementing cryptographic systems for 5G systems that are small and energy-efficient, e.g., in order to satisfy strict limitations of battery-powered mobile devices in new generations of products and applications. Same or other embodiments provide high levels of assurance for vital societal services, such as traffic, e-health, smart-city management, and environmental monitoring.

The confidence in stream ciphers is higher and their acceptance is faster if they are built from components whose security can be formally analyzed, e.g., as discussed above. The feedback functions and the output function (e.g., number and position of inputs, nonlinearity, resiliency, algebraic degree, etc.) allow controlling the level of assurance so that the resulting generating device is resistant to known attacks with a sufficient security margin.

At least some embodiments of a stream cipher include a 1-bit per cycle version of the generating device and occupy less than 1500 GE, achieve a throughput of 2.22 Gbits/sec and a latency of 232 ns.

The technique combines advantages of the Galois configuration of NLFSRs, e.g., short circuit depth (implying small propagation time and high throughput), with the advantages of the transformed NLFSR version, for which it is possible to formally analyze security. Furthermore, a hardware footprint can be minimized.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of generating a keystream for ciphering or deciphering a data stream, the method comprising:
   operating a nonlinear feedback shift register, (NLFSR) including n register stages implemented in a Galois configuration,
   wherein at least one register stage of the implemented n register stages is representable by at least one register stage of a linear feedback shift register (LFSR), and
   wherein a first subset of the implemented n register stages is representable by a second subset of a second NLFSR, wherein a number of register stages receiving a nonlinear feedback in the second NLFSR is greater than one and less than a number of register stages receiving a nonlinear feedback in the implemented NLFSR; and
   outputting the keystream from a nonlinear output function, wherein an input of the nonlinear output function is coupled to at least two of the implemented n register stages of the NLFSR.

2. The method of claim 1, wherein the nonlinear output function includes linear terms that depend only on the first subset of the implemented n register stages of the NLFSR.

3. The method of claim 1, wherein all most-biased linear approximations of the nonlinear output function depend only on the first subset of the implemented n register stages of the NLFSR.

4. The method of claim 1, wherein the number of register stages receiving a nonlinear feedback in the second NLFSR is even, and the at least one register stage is arranged in shift direction downstream of the nonlinear feedback in the implemented NLFSR.

5. The method of claim 1, wherein the at least one register stage of the implemented n register stages is further representable by at least one register stage of the second NLFSR.

6. The method of claim 1, wherein each of the register stages receiving the nonlinear feedback in the second NLFSR represents a register stage in the implemented NLFSR.

7. The method of claim 1, wherein the nonlinear feedback in the second NLFSR is computed for each of the register stages receiving the nonlinear feedback according to a common feedback function that is shifted corresponding to the respective register stage.

8. The method of claim 7, wherein a nonlinearity of the common feedback function is greater than 500·n.

9. The method of claim 7, wherein a resiliency of the common feedback function is equal to or greater than 5.

10. The method of claim 7, wherein an algebraic degree of the common feedback function is equal to or greater than 4.

11. The method of claim 7, wherein the common feedback function includes less than 0.15·n binary Boolean operations.

12. The method of claim 1, wherein a period of the implemented NLFSR is $2^n-1$.

13. The method of claim 1, wherein each of the second NLFSR and the LFSR includes n register stages.

14. The method of claim 1, wherein the second NLFSR is in a Galois configuration.

15. The method of claim 1, wherein the LFSR is in a Fibonacci configuration.

16. The method of claim 1, wherein the first subset is a proper subset of the implemented n register stages.

17. The method of claim 1, wherein the first subset includes more than two consecutive register stages of the implemented NLFSR.

18. The method of claim 1, wherein the keystream is a bit stream and the nonlinear output function is a balanced Boolean function.

19. The method of claim 1, wherein a nonlinearity of the nonlinear output function is greater than 2000·n.

20. The method of claim 1, wherein a resiliency of the nonlinear output function is equal to or greater than 5.

21. The method of claim 1, wherein an algebraic degree of the nonlinear output function is equal to or greater than 6.

22. The method of claim 1, wherein the nonlinear output function includes less than 0.1·n binary Boolean operations.

23. The method of claim 1, wherein more than half of the register stages on which the nonlinear output function depends are selected from a full positive difference set of the implemented n register stages of the NLFSR.

24. The method of claim 1, wherein all register stages on which the nonlinear output function depends are non-consecutive in the implemented NLFSR.

25. The method of claim 1, wherein the nonlinear output function is pipelined in a binary tree configuration.

26. The method of claim 1, wherein a combinatorial circuit depth of the binary tree configuration is at most 2.

27. The method of claim 1, further comprising:
initializing the implemented n registers of the NLFSR, wherein the first subset of the implemented n register stages is at least partially initialized by a key.

28. The method of claim 27, wherein the initialization further includes clocking the implemented NLFSR for n cycles during which the nonlinear output function is fed back to the implemented NLFSR.

29. The method of claim 1, further comprising:
adding the data stream and the keystream outputted from the nonlinear output function for ciphering or deciphering the data stream.

30. A computer program product comprising a non-transitory readable medium storing program code portions for performing the steps of claim 1 when the computer program product is executed on one or more computing devices.

31. A device for generating a keystream for ciphering or deciphering a data stream, the device comprising:
a nonlinear feedback shift register, NLFSR, including n register stages implemented in a Galois configuration, wherein at least one register stage of the implemented n register stages is representable by at least one register stage of a linear feedback shift register, LFSR, and
wherein a first subset of the implemented n register stages is representable by a second subset of a second NLFSR, wherein a number of register stages receiving a nonlinear feedback in the second NLFSR is greater than one and less than a number of register stages receiving a nonlinear feedback in the implemented NLFSR; and
a nonlinear output function for outputting the keystream, wherein an input of the nonlinear output function is coupled to at least two of the implemented n register stages of the NLFSR.

32. The device of claim 31, wherein the nonlinear output function includes linear terms that depend only on the first subset of the implemented n register stages of the NLFSR.

33. The device of claim 31, wherein all most-biased linear approximations of the nonlinear output function depend only on the first subset of the implemented n register stages of the NLFSR.

34. The device of claim 1, wherein the number of register stages receiving a nonlinear feedback in the second NLFSR is even and the at least one register stage is arranged in shift direction downstream of the nonlinear feedback in the implemented NLFSR.

35. The device of claim 1, wherein the at least one register stage of the implemented n register stages is further representable by at least one register stage of the second NLFSR.

36. The device of claim 32, wherein each of the register stages receiving the nonlinear feedback in the second NLFSR represents a register stage in the implemented NLFSR.

37. The device of claim 1, wherein the nonlinear feedback in the second NLFSR is computed for each of the register stages receiving the nonlinear feedback according to a common feedback function that is shifted corresponding to the respective register stage.

38. The device of claim 37, wherein a nonlinearity of the common feedback function is greater than 500·n.

39. The device of claim 37, wherein a resiliency of the common feedback function is equal to or greater than 5.

40. The device of claim 37, wherein an algebraic degree of the common feedback function is equal to or greater than 4.

41. The device of claim 37, wherein the common feedback function includes less than 0.15·n binary Boolean operations.

42. The device of claim 1, wherein a period of the implemented NLFSR is $2^n-1$.

43. The device of claim 1, wherein each of the second NLFSR and the LFSR includes n register stages.

44. The device of claim 1, wherein the second NLFSR is in a Galois configuration.

45. The device of claim 1, wherein the LFSR is in a Fibonacci configuration.

46. The device of claim 1, wherein the first subset is a proper subset of the implemented n register stages.

47. The device of claim 1, wherein the first subset includes more than two consecutive register stages of the implemented NLFSR.

48. The device of claim 1, wherein the keystream is a bit stream and the nonlinear output function is a balanced Boolean function.

49. The device of claim 1, wherein a nonlinearity of the nonlinear output function is greater than 2000·n.

50. The device of claim 1, wherein a resiliency of the nonlinear output function is equal to or greater than 5.

51. The device of claim 1, wherein an algebraic degree of the nonlinear output function is equal to or greater than 6.

52. The device of claim 1, wherein the nonlinear output function includes less than 0.1·n binary Boolean operations.

53. The device of claim 1, wherein more than half of the register stages on which the nonlinear output function depends are selected from a full positive difference set of the implemented n register stages of the NLFSR.

54. The device of claim 31, wherein all register stages on which the nonlinear output function depends are non-consecutive in the implemented NLFSR.

55. The device of claim 1, wherein the nonlinear output function is pipelined in a binary tree configuration.

56. The device of claim 55, wherein a combinatorial circuit depth of the binary tree configuration is at most 2.

57. The device of claim 1, further comprising:
initializing the implemented n registers of the NLFSR, wherein the first subset of the implemented n register stages is at least partially initialized by a key.

58. The device of claim 57, wherein the initialization further includes clocking the implemented NLFSR for n cycles during which the nonlinear output function is fed back to the implemented NLFSR.

59. The device of claim 1, further comprising:
adding the data stream and the keystream outputted from the nonlinear output function for ciphering or deciphering the data stream.

60. A device for ciphering or deciphering a data stream, the device comprising:
a generating device adapted to generate a keystream according to claim 1;
an initializing device adapted to initialize the generating device; and
an adding device adapted to add the data stream and the keystream generated by the generating device for ciphering or deciphering the data stream.

61. An integrated circuit, comprising a device according to claim 1.

62. A mobile terminal, comprising a device according to claim 1.

* * * * *